United States Patent
Somasundaram et al.

(10) Patent No.: US 8,457,049 B2
(45) Date of Patent: Jun. 4, 2013

(54) METHOD AND APPARATUS FOR HANDLING SYSTEM INFORMATION CHANGE

(75) Inventors: Shankar Somasundaram, London (GB); Jean-Louis Gauvreau, La Prairie (CA); Peter S. Wang, East Setauket, NY (US); Paul Marinier, Brossard (CA); Ulises Olvera-Hernandez, Kirkland (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 870 days.

(21) Appl. No.: 12/553,204

(22) Filed: Sep. 3, 2009

(65) Prior Publication Data

US 2010/0120452 A1    May 13, 2010

Related U.S. Application Data

(60) Provisional application No. 61/098,412, filed on Sep. 19, 2008.

(51) Int. Cl.
*H04W 4/00* (2009.01)

(52) U.S. Cl.
USPC ......... 370/328; 370/277; 370/282; 455/422.1

(58) Field of Classification Search
None
See application file for complete search history.

(56) References Cited

U.S. PATENT DOCUMENTS

| | | | |
|---|---|---|---|
| 2008/0153454 A1* | 6/2008 | Haapapuro et al. | 455/404.1 |
| 2008/0192766 A1* | 8/2008 | Ranta-Aho et al. | 370/445 |
| 2008/0205433 A1* | 8/2008 | Pihlaja et al. | 370/461 |
| 2008/0253323 A1* | 10/2008 | Fischer | 370/329 |
| 2008/0267127 A1* | 10/2008 | Narasimha et al. | 370/331 |
| 2008/0268849 A1* | 10/2008 | Narasimha et al. | 455/437 |
| 2008/0268850 A1* | 10/2008 | Narasimha et al. | 455/437 |
| 2009/0034452 A1* | 2/2009 | Somasundaram et al. | 370/328 |
| 2010/0056218 A1* | 3/2010 | Mary et al. | 455/564 |
| 2010/0255850 A1* | 10/2010 | Kaukoranta et al. | 455/450 |

* cited by examiner

*Primary Examiner* — Bob Phunkulh
(74) *Attorney, Agent, or Firm* — Volpe and Koenig, P.C.

(57) ABSTRACT

A method and apparatus for handling system information change. When the system information changes, a wireless transmit/receive unit (WTRU) may be running a procedure. Depending on the nature of the system information, the WTRU may not need to interrupt the procedure to update the system information.

8 Claims, 3 Drawing Sheets

METHOD AND APPARATUS FOR HANDLING SYSTEM INFORMATION CHANGE

CROSS REFERENCE TO RELATED APPLICATION(S)

This application claims priority from U.S. Provisional Patent Application No. 61/098,412, filed Sep. 19, 2008.

FIELD OF INVENTION

This application is related to wireless communications.

BACKGROUND

Under certain circumstances a network may change the system information (SI) at specific radio frames, but in order to be effective, it must first notify associated wireless transmit/receive units (WTRUs) about this change with a paging message during a time period defined as a modification period (MP). At the end of this MP, when a new MP starts at an MP boundary, the Evolved Universal Mobile Telecommunications System (UMTS) Terrestrial Radio Access Network (E-UTRAN) broadcasts the new SI and the WTRUs need to acquire this new SI. The WTRUs must use the updated SI to operate properly. There is a relatively short time period (or window) during which WTRUs must acquire the new SI.

It is possible that a random access channel (RACH) procedure can collide with the new SI MP boundary (which may also be referred to as a validity boundary). As shown in FIG. 1, this situation may create problems if not handled appropriately. A RACH procedure may start prior to receiving a paging message that indicates a SI change, or after receiving a paging message indicating such a change, but the RACH procedure may also run over the MP boundary. FIG. 1 shows a case where the RACH procedure starts after the paging notification and runs beyond the new SI MP boundary.

Network configuration updates may trigger a SI change (such as cell barring, access class barring, or a change in RACH parameters) that are critical to the RACH procedure or to the underlying radio resource control (RRC) connection procedure. Minor updates to the SI which have no impact on the RACH procedure and may also trigger a SI change.

Acquiring the new SI can take a significant amount of time. In connected mode, completing the required SI messages such as master information block (MIB), SI block (SIB)-1, and SIB-2 may take approximately 170 ms to 330 ms. If the periodicity of SIB-2 is 160 ms and SIB-2 is acquired successfully in the first attempt, the acquisition of the required SI will typically be approximately 170 ms. Under other conditions, the acquisition time could be longer, e.g., 330 ms. Thus, acquiring the full set of SI messages would take even longer.

In Idle mode, SIB acquisition time could be the same or longer depending on the periodicity of the relevant SIBs, excluding the Earthquake and Tsunami Warning System (ETWS) SIB acquisition. Current standards indicate that a WTRU may apply the received SIBs immediately (i.e., the WTRU does not need to delay using a SIB until all SI messages have been received). So for RACH access, the relevant SIB in SIB acquisition in Idle mode is still SIB-2, and the WTRU spends approximately the same amount of SIB acquisition time as in Connected mode. Before the SIB acquisition is complete in Idle mode, the RACH procedure will not have the appropriate system parameters for operation.

SUMMARY

A method and apparatus for handling SI change. When SI changes, a WTRU may be running a procedure. Depending on the nature of the SI, the WTRU may not need to interrupt the procedure to update the SI depending upon the nature of the SI.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the term "wireless transmit/receive unit (WTRU) includes, but is not limited to, a user equipment (UE), a mobile station, a fixed or mobile subscriber unit, a pager, a cellular telephone, a personal digital assistant (PDA), a computer, or any other type of user device capable of operating in a wireless environment. When referred to hereafter, the term "base station" includes, but is not limited to, a Node B, a site controller, an access point (AP), or any other type of interfacing device capable of operating in a wireless environment.

Figure 2:
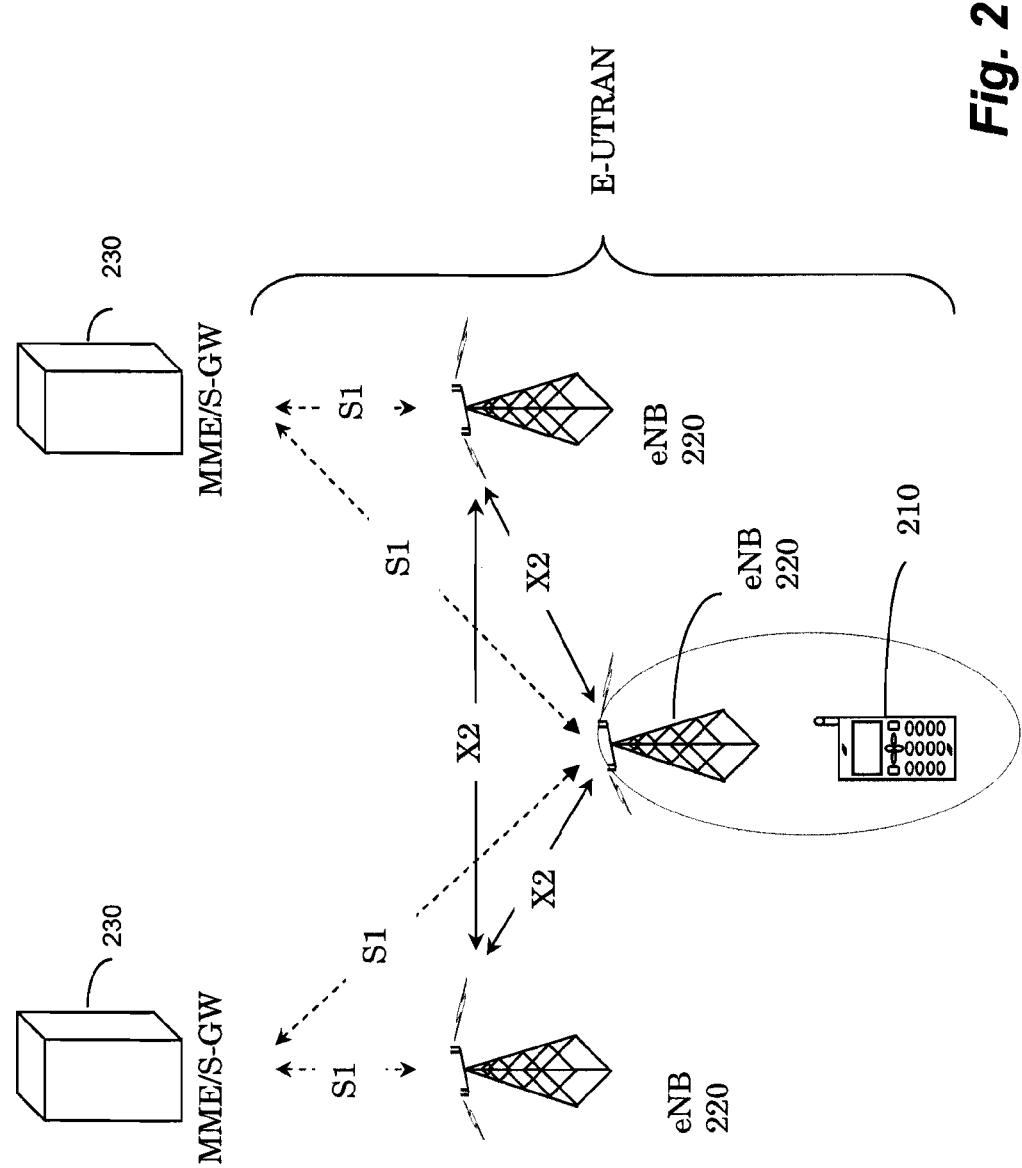
FIG. 2 shows a wireless communication system/access network of Long Term Evolution (LTE)

FIG. 2 shows a wireless communication system/access network of Long Term Evolution (LTE) 200, which includes an Evolved-Universal Terrestrial Radio Access Network (E-UTRAN). The E-UTRAN, as shown, includes a WTRU 210 and several evolved Node Bs, (eNBs) 220. As shown in FIG. 2, the WTRU 210 is in communication with an eNB 220. The eNBs 220 interface with each other using an X2 interface. The eNBs 220 are also connected to a Mobility Management Entity (MME)/Serving GateWay (S-GW) 230, through an S1 interface. Although a single WTRU 210 and three eNBs 220 are shown in FIG. 2, it should be apparent that any combination of wireless and wired devices may be included in the wireless communication system 200.

Figure 3:
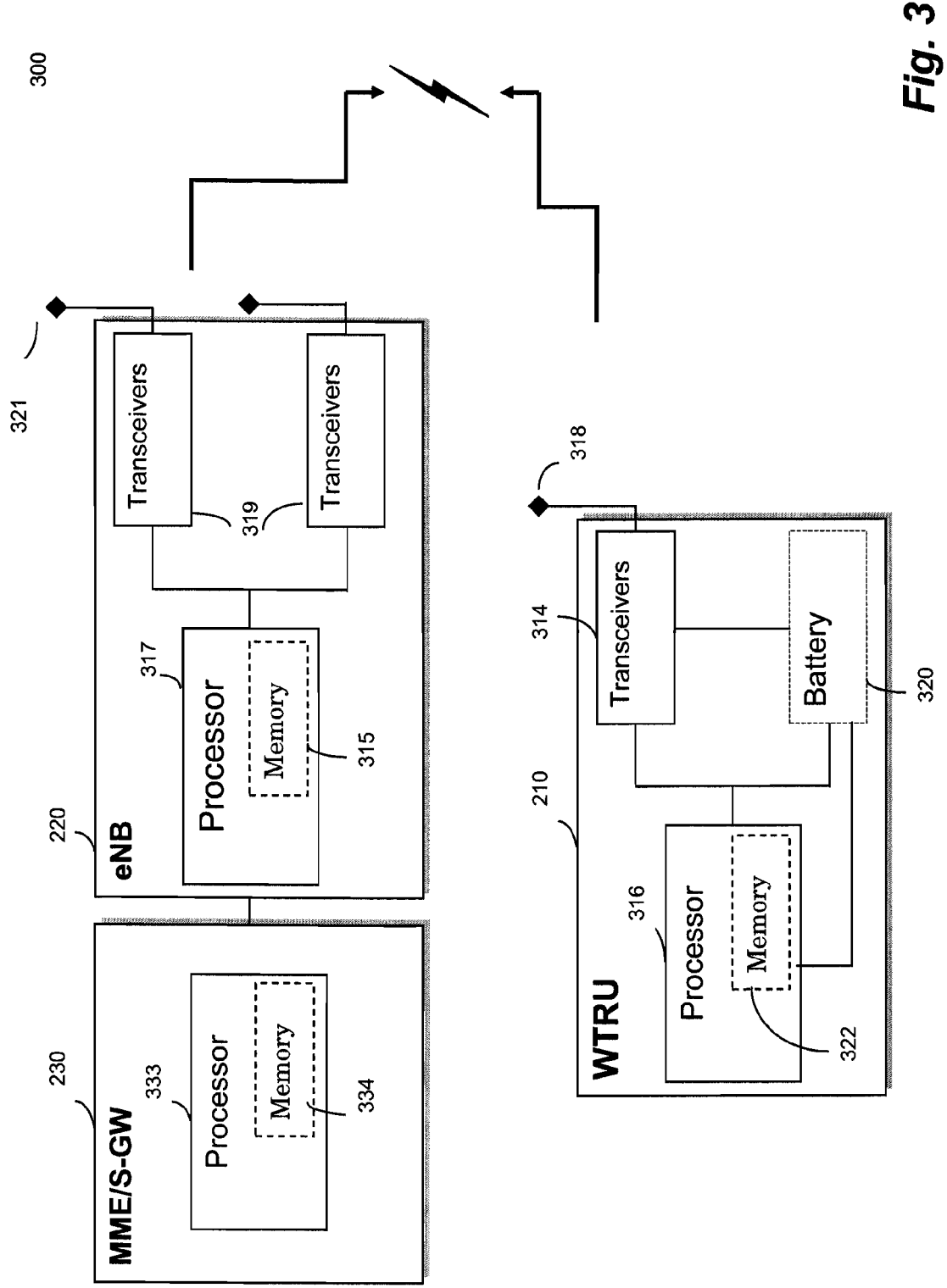
FIG. 3 is an example block diagram of the WTRU of FIG. 2.

FIG. 3 is an example block diagram 300 of the WTRU 210, the eNB 220, and the MME/S-GW 230 of wireless communication system 200 of FIG. 2. As shown in FIG. 3, the WTRU 210, the eNB 220 and the MME/S-GW 230 are configured to perform a method of SI change and RACH procedure.

In addition to the components that may be found in a typical WTRU, the WTRU 210 includes a processor 316 with an optional linked memory 322, transmitters and receivers together designated as transceivers 314, an optional battery 321, and an antenna 318. The processor 316 is configured to perform a method of handling SI change and RACH procedure. The transceivers 314 are in communication with the processor 316 and antenna 318 to facilitate the transmission and reception of wireless communications. In case a battery 320 is used in WTRU 210, it powers the transceivers 314 and the processor 316.

In addition to the components that may be found in a typical eNB, the eNB 220 includes a processor 317 with an optional linked memory 315, transceivers 319, and antennas 321. The processor 317 is configured to perform a method of SI change and RACH procedure. The transceivers 319 are in communication with the processor 317 and antennas 321 to facilitate the transmission and reception of wireless communications. The eNB 220 is connected to the Mobility Management Entity/Serving GateWay (MME/S-GW) 230 which includes a processor 333 with an optional linked memory 334.

A SI change can be triggered by network congestion which may cause a typical priority WTRU access class (e.g., 0-9) to be barred from the network.

In one embodiment, this is handled by allowing a high priority class WTRU (e.g., greater than 10) to continue with the RACH procedure after a SI modification command is received or to continue the RACH procedure beyond the new SI MP boundary. The network might accept a RACH request from a WTRU in a higher priority access class, even if the SI is about to change or has changed. A typical priority class WTRU immediately stops the RACH procedure after the SI change modification command is received. Alternatively, the RACH procedure may be stopped or delayed until the relevant SI has been read, as it is possible that the network might not listen to the RACH from the typical (lower) access class WTRUs if the SI has changed or is about to change. In general, WTRUs with low priority access classes would give higher priority to SI messages over any RRC procedures while high priority access class WTRUs may give priority to continuing the RRC procedure over reading the SI.

Figure 1:
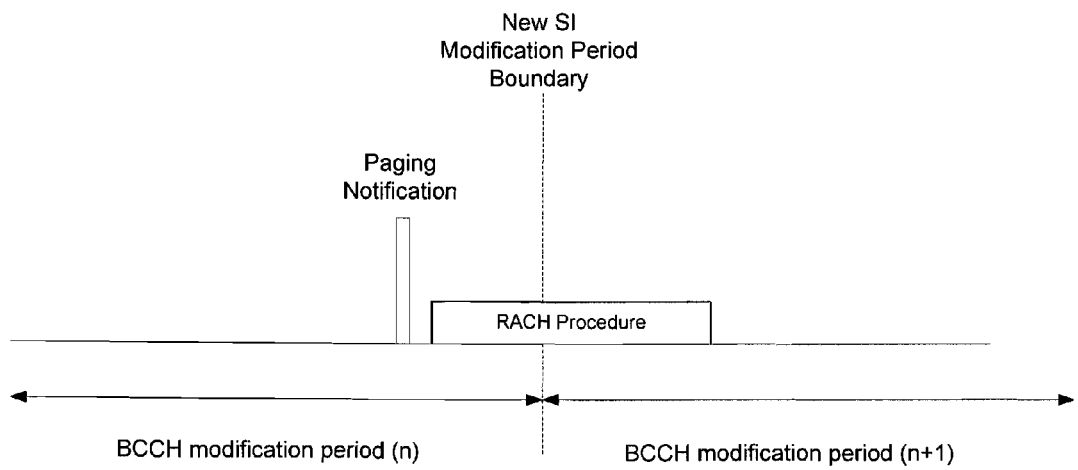
FIG. 1 is a diagram of a RACH procedure crossing a SI MP boundary.
Figure 4:
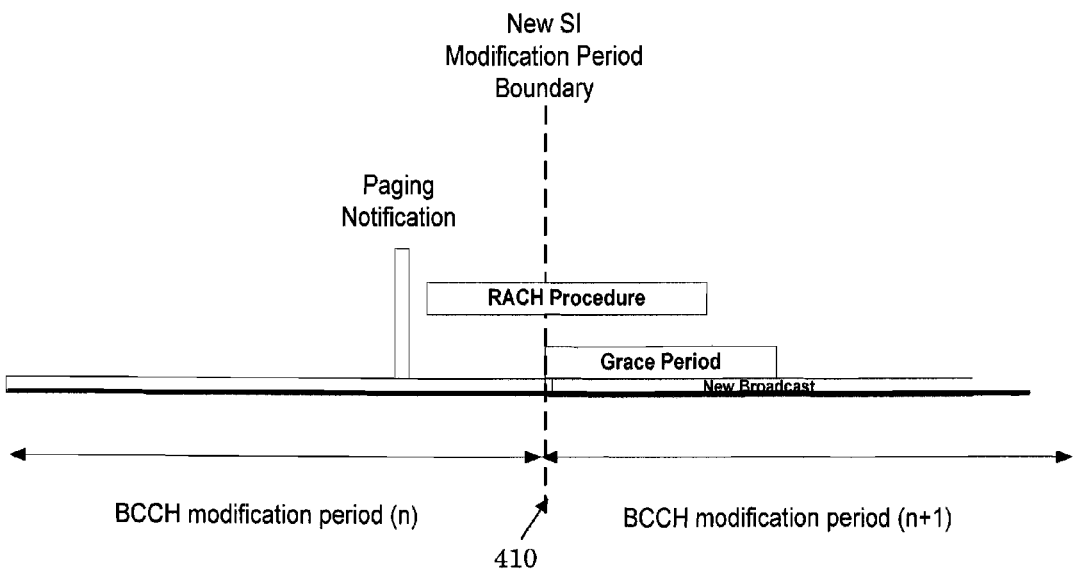
FIG. 4 is a diagram of a RACH procedure crossing a SI MP boundary and a grace period.

In another embodiment, a grace period may be defined where a RACH procedure initiated prior to the SI boundary 410 may run beyond that SI boundary 410 as shown in FIG. 4. During the grace period, the old system configuration or the previous RACH access configuration remain valid.

The grace period may be defined by the E-UTRAN: (1) The grace period is based on the T300 timer which is the RRC Connection timer and related to the RACH procedure; and (2) The grace period may also be based on the minimum SIB-2 acquisition time, i.e., the time for a WTRU to complete reception of the new SIB-2 from the beginning of the new modification period, to the minimum SIB-2 acquisition time.

The grace period may also be signaled by the E-UTRAN to all the WTRUs in the systemInfoModification information element (IE) at the paging message, which contains the SI change notification.

During the grace period, the old configuration continues to be used by the cell/E-UTRAN. The WTRU may also continue to apply the old configuration for a RACH procedure initiated just after the new SI MP boundary but before the new SI has been acquired, while the cell/E-UTRAN has started transmitting the new configuration from the MP boundary. Once the grace period is over, the cell-E-UTRAN applies the new configuration and all WTRUs must use the new configuration.

In one embodiment, a partial SI read (reception or acquisition) is performed in idle mode (or other modes) to avoid stopping the RACH procedure for too long while the new SI is being acquired. In this embodiment, the RACH procedure may be allowed to resume in Idle mode just after critical SI associated with admission control and the RACH procedure have been acquired. Once the new SI is acquired (i.e., SIB 1 cell barring, SIB2 access class barring) or some of the most important SI has been read (MIB, SIB 1, and SIB 2), the RACH procedure resumes in parallel with acquiring the other (additional) SI.

In conventional methods, the paging notification does not differentiate a high priority SI change (such as a RACH access parameter change or a cell selection criteria parameter change, etc.) from a minor SI change (such as a neighbor cell list change). Any SI change requires a complete SI read and could impact the WTRU behavior as previously described. Therefore, a method to differentiate between SI changes that impact cell selection admission or a RACH access procedure, versus minor SI changes in the network configuration is desirable.

In one embodiment, this may be implemented by adding a priority bit field (one or more bits) in the systemInfoModification information element (IE) in the paging message. Specific WTRU behavior may be defined based on the bit field.

By way of example, when the priority bit field is set, it means that the SIB-1, the SIB-2, or both SIB-1, and SIB-2 contents are to be changed. The WTRU's operation may be modified based on the priority bit field. Continuing the example, the WTRUs in either Idle state or Connected state must immediately prepare to receive the SIB-1 and SIB-2.

If the priority bit field is not set, it means that neither SIB-1 nor SIB-2 is to be changed. Therefore, the new SI is not affecting cell-access, SIB-scheduling, the RACH access, and RRC Connection configurations. In this case, ongoing WTRU activities can continue without interruption. The WTRU may schedule a read of the rest of the SIBs (SIB-3 to SIB-9) for the SI change and adjust the cell reselection, intra-frequency, inter-frequency, or inter-RAT neighboring cell measurement activities accordingly with less time contingency. As known by those skilled in the art, specific bit field settings may have alternative meanings.

Another way to differentiate a high priority SI change is to define distinct system change radio network temporary identifiers (SC-RNTI) for the SI change, depending on the priority of the change. For example, the network may use one SC-RNTI value for high priority changes and another SC-RNTI value for low priority changes. The WTRU monitors for both SC-RNTI values. When the SC-RNTI corresponding to a high priority change is decoded, the WTRU may behave accordingly, for example, by interrupting any RACH procedure. Conversely, when the SC-RNTI corresponding to a low priority change is decoded, the WTRU may continue with the RACH procedure.

Several of these schemes described above may be combined to provide a simple and efficient way to handle situations when SI changes collide with a RACH procedure. For example, a low priority SI change may allow the RACH procedure to run beyond the new SI MP boundary up to a grace period. The grace period is defined to allow the WTRU to acquire the complete set of new SI.

A high priority SI change blocks a low priority class WTRU from running a RACH procedure beyond the new SI MP boundary. A high priority class WTRU is allowed to run a RACH procedure up to a grace period. The grace period is defined to allow the WTRU to read critical SI related to admission control and the RACH procedure.

All of the methods and techniques described above could be used alone or in combination with each other. Also, all the solutions described above may be applied to any RRC procedure, i.e., all the solutions could be applied in the case of collisions (MP boundary) between any RRC procedure and a SI modification indication or the new SI itself. Also, all the parameters and methods above could be cell-specific or WTRU specific.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method of handling a system information (SI) change in wireless communications, the method comprising:
   a wireless transmit/receive unit (WTRU) receiving an information element (IE) in a paging message, wherein the IE is a priority bit field comprising at least one bit; and
   the WTRU modifying its behavior based on the IE, wherein the modifying the WTRU's behavior includes:
      on a condition that the IE is set, the WTRU preparing to receive at least one system information block (SIB); or
      on a condition that the IE is not set, the WTRU continuing ongoing activities without interruption.

2. The method of claim 1, wherein the at least one SIB includes at least one of a SIB-1 or a SIB-2.

3. The method of claim 2, wherein WTRU activities include:
   scheduling acquisition of remaining SIBs; and
   adjusting at least one of cell reselection, intra-frequency, inter-frequency, or inter-radio access technology (RAT) neighboring cell measurement activities.

4. A method of handling a system information (SI) change in wireless communications, the method comprising:
   a wireless transmit/receive unit (WTRU) monitoring for at least one system change radio network temporary identifier (SC-RNTI);
   receiving and decoding the at least one SC-RNTI;
   on a condition that the at least one SC-RNTI value exceeds a priority threshold, interrupting a WTRU procedure including a random access channel (RACH) procedure; and
   on a condition that the at least one SC-RNTI value is less than or equal to the priority threshold, continuing a WTRU procedure including a RACH procedure.

5. A wireless transmit/receive unit (WTRU) for handling a system information (SI) change in wireless communications, the WTRU comprising:
   a receiver configured to receive an information element (IE) in a paging message, wherein the IE is a priority bit field comprising at least one bit; and
   a processor configured to modify the WTRU's behavior based on the IE, such that:
      on a condition that the IE is set, the processor is further configured to prepare the WTRU to receive at least one system information block; or
      on a condition that the IE is not set, the processor is further configured to allow the WTRU to continue ongoing activities without interruption.

6. The method of claim 5, wherein the at least one SIB includes at least one of a SIB-1 or a SIB-2.

7. The WTRU of claim 5, wherein WTRU activities include:
   scheduling acquisition of remaining SIBs; and
   adjusting at least one of cell reselection, intra-frequency, inter-frequency, or inter-radio access technology (RAT) neighboring cell measurement activities.

8. A wireless transmit/receive unit (WTRU) for handling a system information (SI) change in wireless communications, the WTRU comprising:
   a processor configured to monitor for at least one system change radio network temporary identifier (SC-RNTI);
   a transceiver configured to receive and decode the at least one SC-RNTI;
   the processor further configured to:
      on a condition that the at least one SC-RNTI value exceeds a priority threshold, interrupt a WTRU procedure including a random access channel (RACH) procedure; and
      on a condition that the at least one SC-RNTI value is less than or equal to the priority threshold, continue a WTRU procedure including a RACH procedure.

* * * * *